United States Patent [19]

Kervagoret

[11] Patent Number: 4,712,632
[45] Date of Patent: Dec. 15, 1987

[54] ASSISTED STEERING SYSTEM FOR A MOTOR VEHICLE

[75] Inventor: Gilbert Kervagoret, Argenteuil, France

[73] Assignee: Bendix France, Paris, France

[21] Appl. No.: 844,482

[22] Filed: Mar. 26, 1986

[30] Foreign Application Priority Data

Apr. 2, 1985 [FR] France ................... 85 04984

[51] Int. Cl.$^4$ .................. B62D 5/06; B62D 5/09
[52] U.S. Cl. ................... 180/143; 137/504; 137/614.2; 137/614.19; 251/129.15
[58] Field of Search ............ 180/132, 133, 136, 141, 180/142, 143; 137/504, 614.2, 614.19, 606; 251/129.15

[56] References Cited

U.S. PATENT DOCUMENTS

| 4,230,147 | 10/1980 | Booth | 137/606 |
| 4,300,650 | 11/1981 | Weber | 180/143 |
| 4,485,883 | 12/1984 | Duffy | 180/142 |
| 4,541,499 | 9/1985 | Yamai | 180/142 |

FOREIGN PATENT DOCUMENTS

| 3017464 | 12/1980 | Fed. Rep. of Germany | 180/132 |
| 3039975 | 5/1982 | Fed. Rep. of Germany | 180/132 |
| 38514 | 6/1965 | German Democratic Rep. | 180/132 |
| 6247 | 1/1979 | Japan | 180/141 |
| 201765 | 12/1982 | Japan | 180/133 |
| 201764 | 12/1982 | Japan | 180/133 |
| 471427 | 9/1937 | United Kingdom | 251/129.15 |

Primary Examiner—John J. Love
Assistant Examiner—Everett G. Diederiks, Jr.
Attorney, Agent, or Firm—Larry J. Palguta; Ken C. Decker

[57] ABSTRACT

In a branch hydraulic line ($6_a$, $6_b$) upstream of the distribution servovalve (1) of the assisted steering system, a valve mechanism with electromagnetic control (10) is situated, which comprises a valve member biased by an electromagnetic actuator (16) having two states, energized and unenergized, which is controlled by a switch ($20_a$, $20_b$) actuable by the lever (21) of the gear changing mechanism of the vehicle so as to close the branch line ($6_a$, $6_b$) during engagement of the parking gears (first and reverse) and thus to obtain maximum hydraulic assistance power, the assistance power being reduced during other conditions of use (driving along the road) of the vehicle.

5 Claims, 3 Drawing Figures

FIG_1

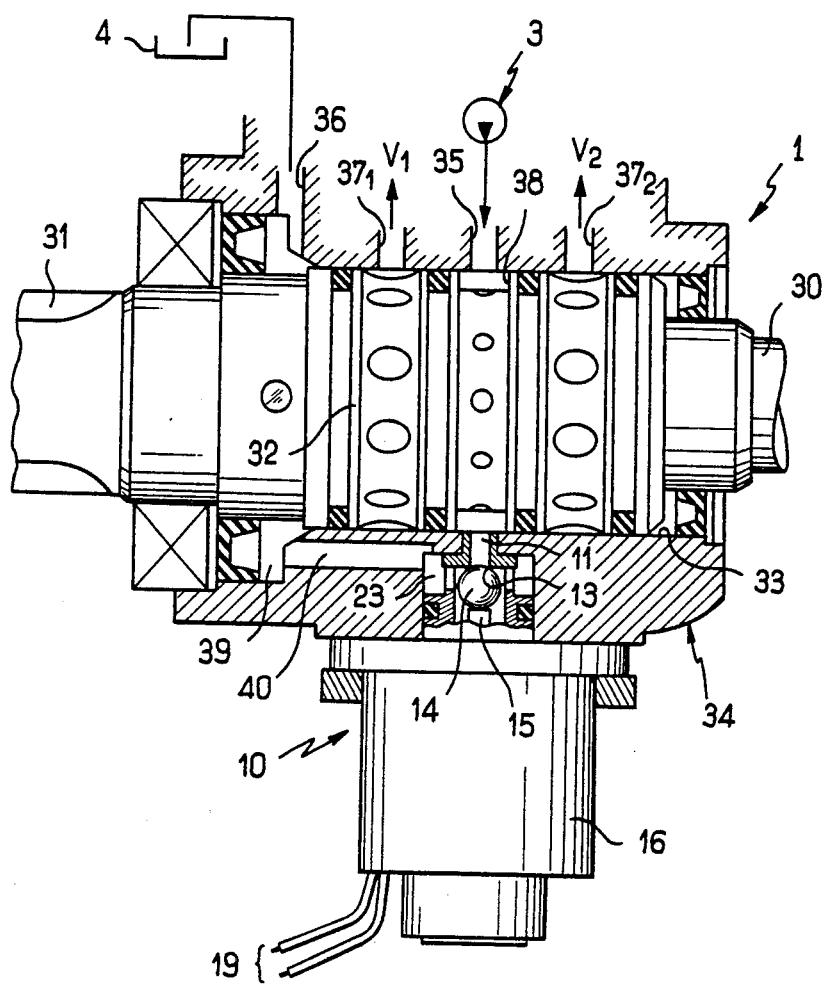
FIG_3

ASSISTED STEERING SYSTEM FOR A MOTOR VEHICLE

The present invention concerns assisted steering systems for motor vehicles with a hand lever for a gear changing mechanism, of the type comprising: a source of pressure, a reservoir, a distribution valve device including, in a valve body, an inlet port connected to the outlet of the source of pressure, an outlet port connected to the reservoir, and at least one working port connected to a chamber of a hydraulic assistance actuator, and a valve means with electromagnetic control which is interposed in a branch hydraulic line between the outlet of the source of pressure and the reservoir and is connected to an electrical control circuit.

An assisted steering system of this type is described in the document DE-A-2,412,337. In this document, the valve means with electromagnetic control comprises a modulating slide which is coupled mechanically to a plunger of an electromagnetic control member of the proportional type which is in turn controlled by the amplitude of an electrical signal which is a function particularly of the speed of the vehicle, in an arrangement requiring a relatively sophisticated and fragile operation and control electrical circuit for controlling a magnetic field controlling permanently the position of the modulating slide thus to modulate the pressure of the hydraulic fluid which is addressed to the distribution valve device controlling the hydraulic assistance actuator.

In fact, in practice, the full power of an assisted steering system is required essentially during parking maneuvers whereas during phases of driving along the road, or even in town, a reduced power is sufficient, irrespective of the effective speed of the vehicle during these phases of driving along.

One object of the present invention is to propose an assisted steering system of the type mentioned above with control of the hydraulic assistance power in two modes as a function of the driving conditions of the vehicle in an arrangement which is particularly simple and robust, requiring only inexpensive components and having improved reliability.

To achieve this, according to a feature of the invention, the valve means with electromagnetic control comprises a fluid passage between an inlet port which communicates with the inlet port of the distribution valve device, and an outlet port which communicates with the reservoir, and the fluid passage incorporates a valve seat which may be closed selectively by a valve member associated to a plunger of an electromagnetic actuator, the electrical control circuit of the latter including at least one switch actuatable by the lever for the gear changing mechanism.

In this arrangement, with such a switch arranged so as to close when the first or reverse gear is engaged so as to close in turn the valve component onto its seat, the full power of the source of pressure is thus addressed to the hydraulic assistance actuator, via the distribution valve device, in the usual parking conditions of the vehicle whereas, as soon as second gear is engaged, the electromagnetic actuator is de-energized and the branch line is opened, advantageously via a calibrated restriction formed in the fluid passage, thus substracting from the distribution valve device a bypassed flow which is cancelled once again as soon as the vehicle regains parking conditions. The assisted steering system according to the invention is equally suitable for a vehicle provided with an automatic gear changing mechanism with a selection lever incorporating parking and reverse positions.

Other features and advantages of the present invention will emerge from the following description of embodiments which are given by way of illustration but are not limiting in any way, with reference to the accompanying drawings, in which:

FIG. 3 is a diagrammatic view, partially sectioned, of an embodiment which is integrated into an assisted steering system according to the invention.

In the description which follows and in the drawings, identical or similar components carry the same reference numbers.

Figure 1:
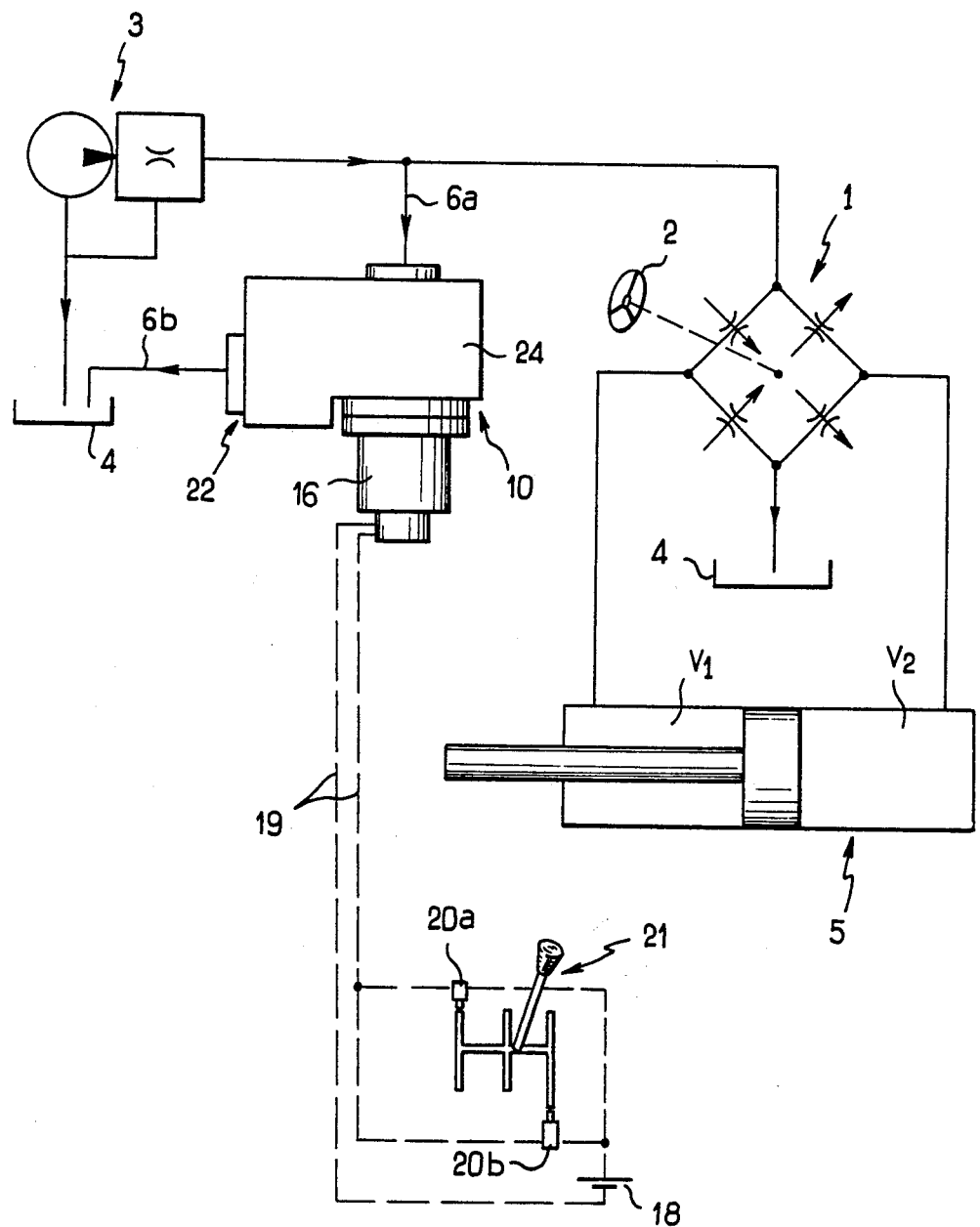
FIG. 1 is a diagrammatic illustration of an assisted steering sytem according to the invention.

The diagram of FIG. 1 shows an assisted steering system for a vehicle comprising, in a manner which is in itself known, a distribution servovalve 1, which is actuated by the steering wheel 2 of the vehicle and is interposed between a source of fluid under pressure 3, generally equipped with a built-in flow regulating device, and a low pressure reservoir or tank 4, and which is actuatable so as to selectively supply with fluid under pressure at least one chamber $V_1$, $V_2$ of a hydraulic actuator 5 for assistance with steering, generally of the type with two opposing pressure chamber $V_1$, $V_2$. In accordance with the invention, in a branch hydraulic line, consisting of two successive portions $6_a$ and $6_b$, between the outlet of the source of pressure 3 and the reservoir 4, a valve means with electromagnetic control is interposed, given the general reference 10, which is arranged so as to divert selectively a portion of the flow which is addressed to distribution servovalve 1 via the branch hydraulic line $6_a$, $6_b$ towards the reservoir 4.

Figure 2:
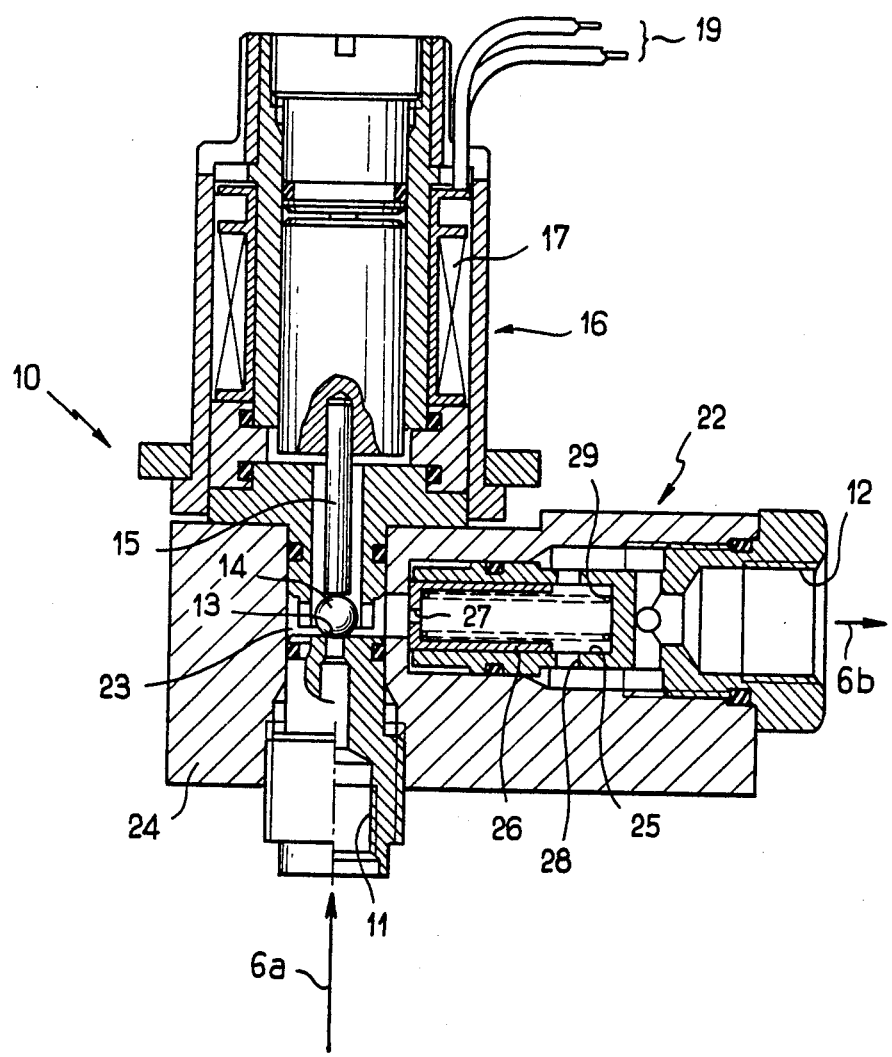
FIG. 2 is an illustration in section of a valve means with electromagnetic control for the system shown in FIG. 1.

More specifically, as shown clearly in FIGS. 2 and 3, the valve means with electromagnetic control 10 defines internally a fluid passage between an inlet port 11 which is connected to the upstream portion $6_a$ of the branch line, and an outlet port 12, which is connected to the downstream portion $6_b$ of the branch line. In this fluid passage a valve seat 13 is arranged which may be closed selectively by a valve member 14 which is associated to a plunger 15 of an electromagnetic actuator 16, of the type having two states, energized or unenergized, whose coil 17 is connected to an electrical source 18 by an electrical control line 19 including at least one electrical switch $20_a$, $20_b$ of the type which is either open or closed.

In accordance with the invention, the electrical switch $20_a$, $20_b$ is associated to the lever 21 of the gear changing mechanism of the vehicle. In the example shown in FIG. 1, corresponding to a manual gear changing mechanism with European gate, two switches $20_a$ and $20_b$ are provided which are arranged relative to the gate so as to close when the lever for the gear changing mechanism 21 engages first or reverse, respectively. Thus, as mentioned above, when first or reverse is engaged, the corresponding electrical switch $20_a$ or $20_b$ closes, thus closing the electrical line 19 and energizing the electromagnetic actuator 16 so as to hold the valve member 14 onto its seat 13 thus isolating the portions $6_a$ and $6_b$ of the branch line from one another. However, when the lever 21 engages another gear, the switches $20_a$ and $20_b$ are opened, the effect of which is to de-energize the electromagnetic actuator 16 and to allow the valve member 14 to disengage from its seat 13 under the effect of the pressure existing in the input port 11.

In the embodiment shown in FIG. 2, the valve means 10 incorporates a flow regulator of the closed center type 22 positioned on the exhaust between the outlet port 12 and an internal chamber 23 into which the valve seat opens and into which the tubular mounting base of the actuator 16 is inserted. In this embodiment, the chamber 23 is formed in an independent body 24 in which the flow regulator 22 is arranged, which comprises, slidably mounted in a bore 25 between the chamber 23 and the outlet port 12, a slide 26 which is provided with a fixed restriction 27 and is capable of cooperating selectively with discharge openings 28 formed in the bore 25 against a spring 29.

The regulator 22 also enables, when the valve member 14 is disengaged from its seat 13, the branch line flow to be held constant in the branch line $6_a$, $6_b$, (as a function of the calibration of the spring 29, of the transverse cross-section of the slide 26 and of the cross-section of the restriction 27) irrespective of the pressure existing in the inlet port 11.

For a number of vehicles, it is not necessary to provide, for the assistance curve for driving along the road, an accurately regulated flow for the servovalve 1. It is possible in this case to eliminate the flow regulator 22, the flow bypassed in the branch line $6_a$, $6_b$ being regulated in this case over a reduced range by constructing the seat 13 in the form of a calibrated hole of small cross-section, the bypassed flow then being dependent on the supply pressure provided by the source 3, which is in fact essentially regulated elsewhere. According to this approach, it is then possible to construct an assisted steering system according to the invention in an arrangement which is particularly compact and whose manufacturing cost is reduced, shown in FIG. 3.

This FIG. 3 shows diagrammatically the distribution servovalve 1 which is constructed in the form of a rotary servovalve with an input member 30 which is intended to be connected to the steering wheel 2, and an output member 31, which is intended to be connected to the mechanism for steering the wheels of the vehicle and is firmly fixed to a distribution sleeve 32 which is mounted so as to rotate in a bore 33 of a valve body 34. Opening into the bore 33 are an inlet port 35, which is connected to the source 3, an outlet port 36, which is connected to the reservoir 4, and two working ports $37_1$ and $37_2$, which are connected to the chambers $V_1$ and $V_2$, respectively, of the hydraulic assistance actuator 5. The inlet port 35 communicates with a peripheral annular groove 38 on the sleeve 32. In accordance with a feature of the invention, the chamber 23, in which the electromagnetic actuator 16 is mounted, is formed in the valve body 34 and communicates with the groove 38 through an insert forming the inlet port 11 and the calibrated seat 13 for the valve component 14. The outlet port 36 of the valve 1 communicates with an internal chamber 39 formed by an enlarged end of the bore 33 and the outlet port (12) of the valve means with electromagnetic control 10 in this case is formed a passage 40 formed in the body 34 which interconnects the chambers 23 and 39. The operation of the assisted steering system shown in FIG. 3 is otherwise identical in all respects to that previously described in relation to FIG. 1.

I claim:

1. In a motor vehicle having a lever of a gear changing mechanism, an assisted steering system comprising a source of pressure, a reservoir, a distribution valve device comprising an inlet port connected to an outlet of the source of pressure, an outlet port connected to the reservoir, and at least one working port connected to a chamber of a hydraulic assistance actuator, and valve means with electromagnetic control interposed in a branch hydraulic line between the outlet of the source of pressure and the reservoir and connected to an electrical control circuit, the improvement consisting of the valve means with electromagnetic control comprising a fluid passage between an inlet port which communicates with the inlet port of the distribution valve device and an outlet port which communicates with the reservoir, the fluid passage including a valve seat which may be closed selectively by a ball valve member biased by a plunger of an electromagnetic actuator, the valve seat forming a calibrated restriction in a control body receiving a mounting base of the electromagnetic actuator and the inlet port of the fluid passage, the inlet port of the fluid passage adjacent a seal, the mounting base secured to the control body and having a seal thereabout, the ball valve member housed in a cavity located between the seals and forming part of the fluid passage, the electrical control circuit including at least one switch actuable by the lever of the gear changing mechanism in order to actuate the electromagnetic actuator, the switch engageable by the lever and connected directly, by means of the electrical control circuit, to only the electromagnetic control and a power source.

2. The system in accordance with claim 1, wherein the valve means with electromagnetic control comprises, in the control body and between the valve seat and outlet port of the fluid passage, a flow regulator comprising an elastically biased slide provided with a calibrated fixed restriction, and a pair of discharge openings separate from the fixed restriction and communicating with the outlet port of the passage, fluid flow through the discharge openings controlled as a function of positioning of the slide relative to the control body.

3. The system in accordance with claim 1, characterized in that the valve means with electromagnetic control is mounted on the control body which is part of the distribution valve device, the inlet port of the fluid passage communicating, in the device, with the inlet port of the distribution valve device.

4. The system in accordance with claim 3, wherein the outlet port of the fluid passage communicates, in the device, with the outlet port of the distribution valve device.

5. The system in accordance with claim 1, wherein the seal adjacent the inlet port of the fluid passage is disposed about the inlet port and the cavity defined between the seals.

* * * * *